United States Patent

Agrawal

(10) Patent No.: US 8,161,522 B1
(45) Date of Patent: Apr. 17, 2012

(54) METHOD AND APPARATUS FOR USING EXPIRATION INFORMATION TO IMPROVE CONFIDENTIAL DATA LEAKAGE PREVENTION

(75) Inventor: Mukund S. Agrawal, Pune (IN)

(73) Assignee: Symantec Corporation, Mountain View, CA (US)

( * ) Notice: Subject to any disclaimer, the term of this patent is extended or adjusted under 35 U.S.C. 154(b) by 980 days.

(21) Appl. No.: 12/135,713

(22) Filed: Jun. 9, 2008

(51) Int. Cl.
*G06F 7/00* (2006.01)
*G06F 17/00* (2006.01)
*G06F 7/04* (2006.01)

(52) U.S. Cl. ............. 726/1; 726/2; 707/736; 707/740; 707/758

(58) Field of Classification Search .................. None
See application file for complete search history.

(56) References Cited

U.S. PATENT DOCUMENTS

| | | | | |
|---|---|---|---|---|
| 5,204,812 | A * | 4/1993 | Kasiraj et al. ................... 1/1 |
| 5,987,464 | A * | 11/1999 | Schneider ......................... 1/1 |
| 5,991,709 | A * | 11/1999 | Schoen ........................... 704/1 |
| 6,324,650 | B1 * | 11/2001 | Ogilvie ........................... 726/2 |
| 6,603,857 | B1 * | 8/2003 | Batten-Carew et al. ....... 380/44 |
| 6,813,358 | B1 * | 11/2004 | Di Crescenzo et al. ...... 380/280 |
| 7,228,307 | B2 * | 6/2007 | Dettinger et al. ................. 1/1 |
| 7,281,273 | B2 * | 10/2007 | Strom et al. ................... 726/27 |
| 7,610,315 | B2 * | 10/2009 | Chang et al. ..................... 1/1 |
| 7,788,235 | B1 * | 8/2010 | Yeo ............................ 707/687 |
| 2004/0073634 | A1 * | 4/2004 | Haghpassand ............... 709/220 |
| 2006/0004588 | A1 * | 1/2006 | Ananda ............................ 705/1 |
| 2009/0300751 | A1 * | 12/2009 | Krishnamurthy et al. ...... 726/13 |

OTHER PUBLICATIONS

Layland, "Data Leak Prevention: Coming Soon to a Business Near You", Business Communications Review, May 2007, pp. 44-49.*
Tech Workshop, Advanced IT Security: "Architecture and Solutions for Data in Motion," Information Gateways Pty. Ltd., Sep. 18-21, 2007.
Press Release: "Vincera, Inc. Announces Email Thread Security in Version 3.0 of it's Software," Vincera, Inc., Jun. 6, 2007.
Vincera, Inc. Annual Report (Small Business Issuers) (10KSB) Item 1, Description of Business, etc.; excerpt from a 10KSB SEC Filing, filed by Vincera, Inc. on Apr. 2, 2007.

* cited by examiner

*Primary Examiner* — William Powers
(74) *Attorney, Agent, or Firm* — Campbell Stephenson LLP

(57) ABSTRACT

A method and apparatus for using expiration information to improve confidential data leakage prevention is described. In one embodiment, a method for protecting confidential data from disclosure using expiration information, comprises processing the expiration information that is associated with a data specification for the confidential data, wherein the expiration information defines a time period in which the confidential data ceases to be confidential and examining the time period to determine an expiration of the data specification.

17 Claims, 3 Drawing Sheets

METHOD AND APPARATUS FOR USING EXPIRATION INFORMATION TO IMPROVE CONFIDENTIAL DATA LEAKAGE PREVENTION

BACKGROUND OF THE INVENTION

1. Field of the Invention

Embodiments of the present invention generally relate to computer data security systems and, more particularly, to a method and apparatus for preventing confidential data leakage using expiration information.

2. Description of the Related Art

Maintaining the confidentiality of data, such as sensitive data (e.g., credit card numbers), intellectual property rights (e.g., rights to inventions), security exchange commission filings, financial reports and the like is a paramount concern of any organization. If the confidential data is disclosed, the organizations may be harmed by bad publicity and/or financial loss.

The confidentiality of certain data (e.g., documents) may be forever or a simply finite length of time. For example, a document may be confidential until a certain event (e.g., public announcement, filing and the like) or a particular moment in time (e.g., Last day of the month, a number of hours and the like). In order to ensure the confidentiality of the sensitive data, such organizations implement various security systems (e.g., data leakage prevention (DLP) products) to protect the sensitive data from disclosure (i.e., data leakage) to the public and/or any other unauthorized person.

Generally, a data leakage prevention product is configured to protect the confidential data by comparing outbound data to a data specification that describes documents and/or other data that is to remain confidential. Such a comparison consumes various computer resources. Occasionally, the DLP product blocks data that is no longer confidential. As a result, the DLP product may consume a lot of unnecessary cycles on outgoing data checks against these data specifications, and in some cases may hamper the rate of outgoing traffic.

Hence, typical DLP products are inefficient and not effective. The DLP product wastes a significant amount of resources comparing formally confidential documents to the data specifications to determine if the transmission of such formally confidential documents should be blocked. Consequently, such operations of the DLP products slow down a network for the organization by consuming network resources (e.g., reducing an amount of available bandwidth).

Accordingly, there is a need in the art for method and apparatus for identifying data that is no longer confidential using expiration information in order to improve data leakage prevention.

SUMMARY OF THE INVENTION

Embodiments of the present invention generally relate to a method and apparatus for using expiration information to improve data leakage protection by identifying data that is no longer confidential. In one embodiment, a method for protecting confidential data using expiration information comprising processing the expiration information that is associated with a data specification for the confidential data, wherein the expiration information defines a time period in which the confidential data ceases to be confidential and examining the time period to determine an expiration of the data specification.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
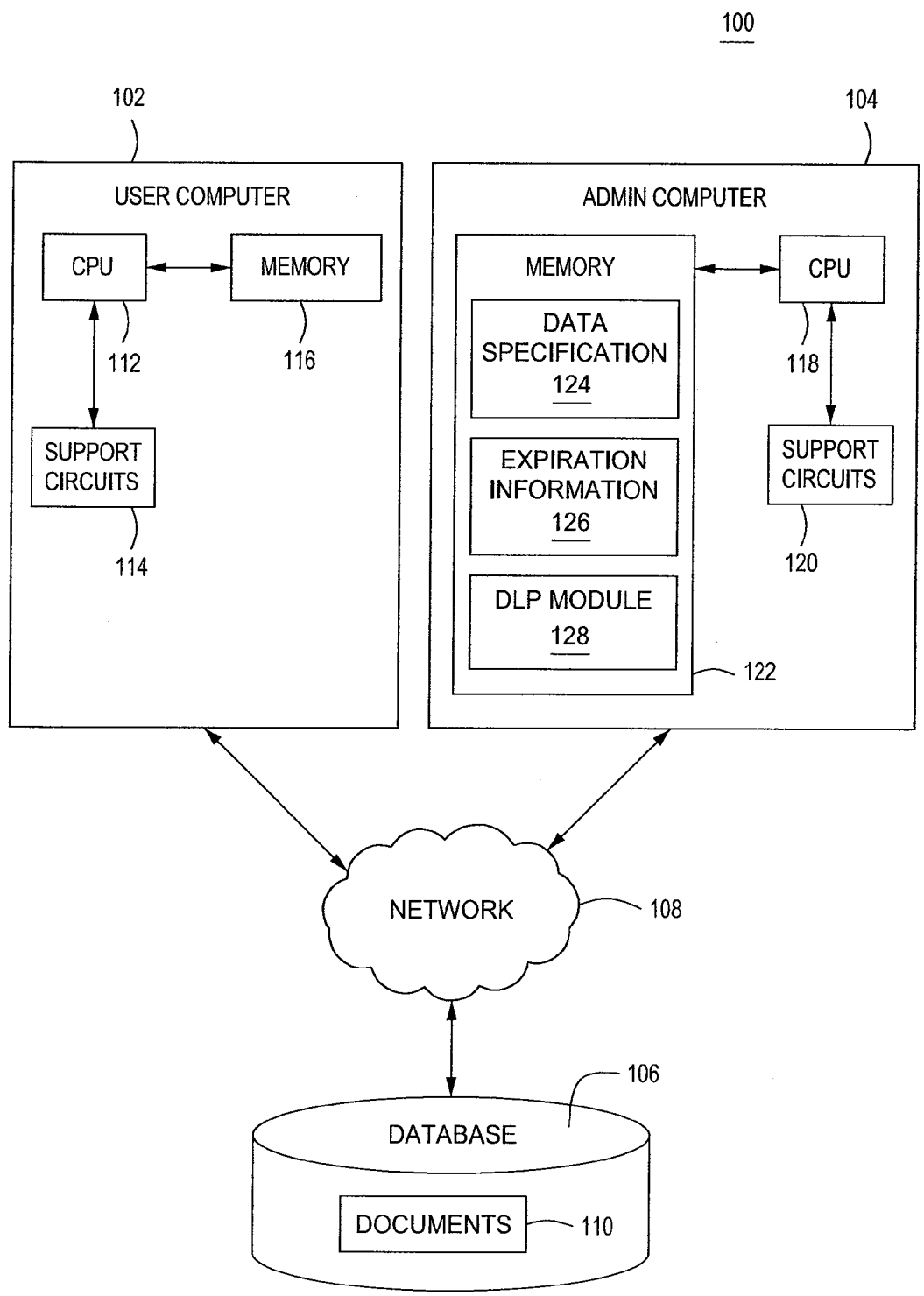
FIG. 1 is a block diagram of a system for protecting confidential data from disclosure using expiration information according to an embodiment of the present invention.

FIG. 1 is a block diagram of a system 100 for protecting confidential data from disclosure according to an embodiment of the present invention. The system 100 comprises a user computer 102, an admin computer 104 and a database 106, each coupled to each other through a network 108.

The user computer 102 is a computing device (e.g., a laptop, a desktop, a Personal Desk Assistant (PDA), a tablet, a mobile phone and the like) that comprises, without limitation, a CPU 112, various support circuits 114 and a memory 116. The CPU 112 may be one or more of any commercially available microprocessors or microcontrollers that facilitate data processing and storage. The support circuits 114 may include clock circuits, buses, power supplies, input/output circuits and/or the like that are used in support of the operation of the CPU 112. The memory 116 includes a read only memory, random access memory, disk drive storage, optical storage, removable storage, and the like. Various software packages and data may reside within the memory 116 that are not illustrated in FIG. 1.

The admin computer 104 is a computing device (e.g., a laptop, a desktop, a Personal Desk Assistant (PDA), a tablet, a mobile phone and the like) that comprises, without limitation, a CPU 118, various support circuits 120, and a memory 122. The CPU 116 may be one or more of any commercially available microprocessors or microcontrollers that facilitate data processing and storage. The various support circuits 118 may include clock circuits, buses, power supplies, input/output circuits and/or the like that are used in support of the operation of the CPU 116. The memory 122 includes a read only memory, random access memory, disk drive storage, optical storage, removable storage, and the like. The memory further includes various data, such as a data specification 124 and expiration information 126. The memory 122 further includes various software packages, such as a data leakage prevention (DLP) module 128. Various other software packages and data may reside within the memory 122 that are not illustrated in FIG. 1.

A database 106 is a collection of computer data and may rely upon various software packages to organize the storage of the computer data. The database 106 comprises documents 110 (e.g., MICROSOFT WORD documents, MICROSOFT POWERPOINT presentations, video files, audio files, unstructured documents and the like). The documents 110 may be confidential and require protection from leakage for various periods of time (e.g., financial information, news items (e.g., news broadcasts, articles and the like), Security Exchange Filings, intellectual property (e.g., trade secrets, patentable inventions and copyrighted works), personal or sensitive data (e.g., social security numbers), new product information, planned public announcement and the like).

The network 108 comprises a communication system that connects computers by wire, cable, fiber optic, and/or wireless links facilitated by various types of well-known network elements, such as hubs, switches, routers, and the like. The network 108 may employ various well-known protocols to communicate information amongst the network resources. For example, the network 108 may be part of the Internet or intranet using various communications infrastructure such as Ethernet, WiFi, WiMax, General Packet Radio Service (GPRS), and the like.

The admin computer 104 may be configured to operate as a content filter for outbound data, such as data transmitted from the user computer 102. In one embodiment, the user computer 102 may initiate a process to communicate data from the document 110 from the database 106 (e.g., computer files, such as the documents 110) to a computing device outside the organization (e.g., outside a group of employees that are permitted access to the confidential data). In another embodiment, the user computer 102 may attempt to transmit data from an unstructured data repository (e.g., table data). The admin computer 104 scans the outbound data for confidential data. In one embodiment, the DLP module 128 may use the data specification 124 to identify (i.e., filter) the confidential data within the outbound data. In one embodiment, the DLP module 128 compares the data specification 124 to the outbound data. In one embodiment, the data specification 124 comprises one or more fingerprints (i.e., a collection of words in a document) that are used to distinguish the confidential data from any other data (e.g., like an actual fingerprint is used to distinguish a person from anyone else).

The DLP module 128 may examine the expiration information 126 to ensure that the confidential data is still confidential before the DLP module 128 blocks or prevents the transmission of the confidential data to the computing device outside the organization. In one embodiment, the expiration information 126 may be a time period (e.g., an event, a fixed date and/or time, a number of units of time (e.g., hours, days, months, years and the like)) when the confidential data identified by the data specification 124 is no longer confidential. For example, if the expiration information 126 indicates that the data specification 124 for a particular document of the documents 110 is no longer confidential, the data specification 124 is expired. The DLP module 128 may remove (e.g., delete) the data specification 124. As a result, the admin computer 104 routes the particular document of the documents 110 to the computing device outside the organization. In one embodiment, the particular document of the documents 110 may not be confidential because an event occurred where the particular document was disclosed to the public. Consequently, fewer computer resources may be consumed by the DLP module 128 since the outbound data no longer needs to be compared with the removed data specification 124. Furthermore, when the data specification 124 is determined to be expired, the DLP module 128 may use one or more functions known in the art to change the confidentiality of the particular document according to one embodiment.

Alternatively, the DLP module 128 may use a policy to identify the confidential data within the outbound data and block a transmission of the confidential data. In one embodiment, the data specification 124 comprises such a policy. The policy may be based on pattern matching. For example, the policy may define one or more words that indicate the confidential data (e.g., 'Security Exchange Filing'). Accordingly, the DLP module 128 assigns the expiration information 126 to the policy similar to the data specification 124.

In one embodiment, the expiration information 126 is associated with the confidential data (e.g., the documents 110) upon creation or generation. When a confidential document or a file of a confidential document type is created, the creator (e.g., the user computer 102) or system administrator (e.g., the admin computer 104) may assign the expiration information 126 (e.g., a time period in which the confidentiality ends) to the confidential document or the file of the confidential data type. As such, when the time period ends, the confidential document or the file of the confidential data type may be freely distributed. For example, a television program may be set to air at nine pm. Hence, at any point in time before nine pm, a file containing the television program is confidential. After the television program is broadcasted to the world, it is no longer confidential and the data specification 124 for the file is removed from the admin computer 104. As another example, a patent application is confidential and the property of the client (e.g., large organization). After the publication, the patent application is disclosed to the world and anyone may freely distribute the patent application.

Alternatively, the expiration information 126 may be associated with the confidential data (e.g., the documents 110) before or after the generation or creation of the confidential data. In one embodiment, the expiration information 126 may not established or known until after the generation or creation of the confidential data. For example, the confidential data may be a patent application that is filed with the US Patent and Trademark Office (USPTO) but not yet published due to a non-publication request or a secrecy order. As such, an expiration period (i.e., the expiration information 126) for the patent application is not defined. Hence, the confidentiality of the patent application persists because a disclosure of the patent application is yet to occur. Consequently, if the USPTO allows the patent application and sets a date of publication, then the expiration period may be defined to be the date of publication since the patent application is no longer confidential as of the date of publication. Furthermore, the date of publication is assigned to a data specification associated with the patent application as the expiration period. Accordingly, the patent application may be freely distributed once the expiration period ends (i.e., the date of publication is reached).

Figure 2:
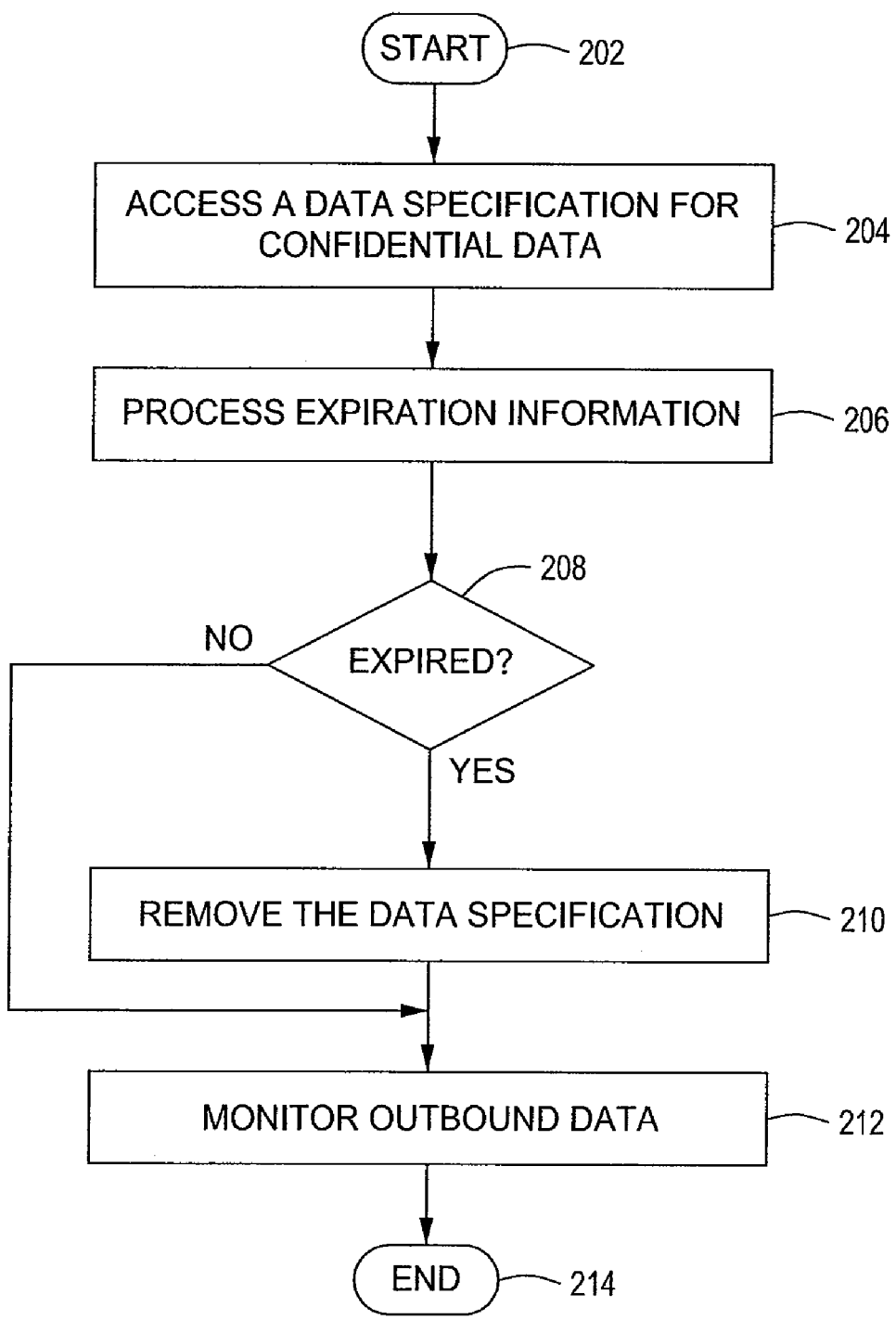
FIG. 2 is a flow diagram of a method for protecting confidential data from disclosure using expiration information according to various embodiments of the present invention.

FIG. 2 depicts a flow diagram of method 200 for protecting confidential data from disclosure using expiration information (e.g., the expiration information 120 of FIG. 1) in accordance with an embodiment of the present invention. The method 200 begins at step 202 and proceeds to step 204.

At step 204, a DLP module (e.g., the DLP module 128 of FIG. 1) accesses a data specification (e.g., the data specification 124 of FIG. 1) for confidential data. In one embodiment, a computer is attempting to transmit the confidential data to an external computing device. As mentioned above, the data specification (e.g. fingerprints, specified policies based on pattern matching, and the like) is used to distinguish confidential data from any other data. At step 206, expiration information for the confidential data is processed.

At step 208, a determination is made as to whether the data specification has expired. In one embodiment, the data specification may be expired if the confidential data is no longer confidential (e.g., due to a disclosure). If the data specification is expired (option "Yes"), the method 200 proceeds to step 210. At step 210, the data specification is removed (e.g., from a portion of the memory 122 used by the DLP module 128 of FIG. 1). If the data specification is not expired (option "No"), the method 200 proceeds to step 212.

At step 212, outbound data is monitored (e.g., by the DLP module 128 of FIG. 1). If the data specification is expired, the outbound data is monitored without the use of the data specification at step 212. Accordingly, the confidential data is routed (e.g., transmitted) to the external computing device. If the data specification is not expired, the outbound data is monitored with the use of the data specification at step 212. Accordingly, the confidential data is blocked and prevented from being transmitted to the external computing device. At step 214, the method 200 ends (e.g., when the outbound data is fully scanned).

Figure 3:
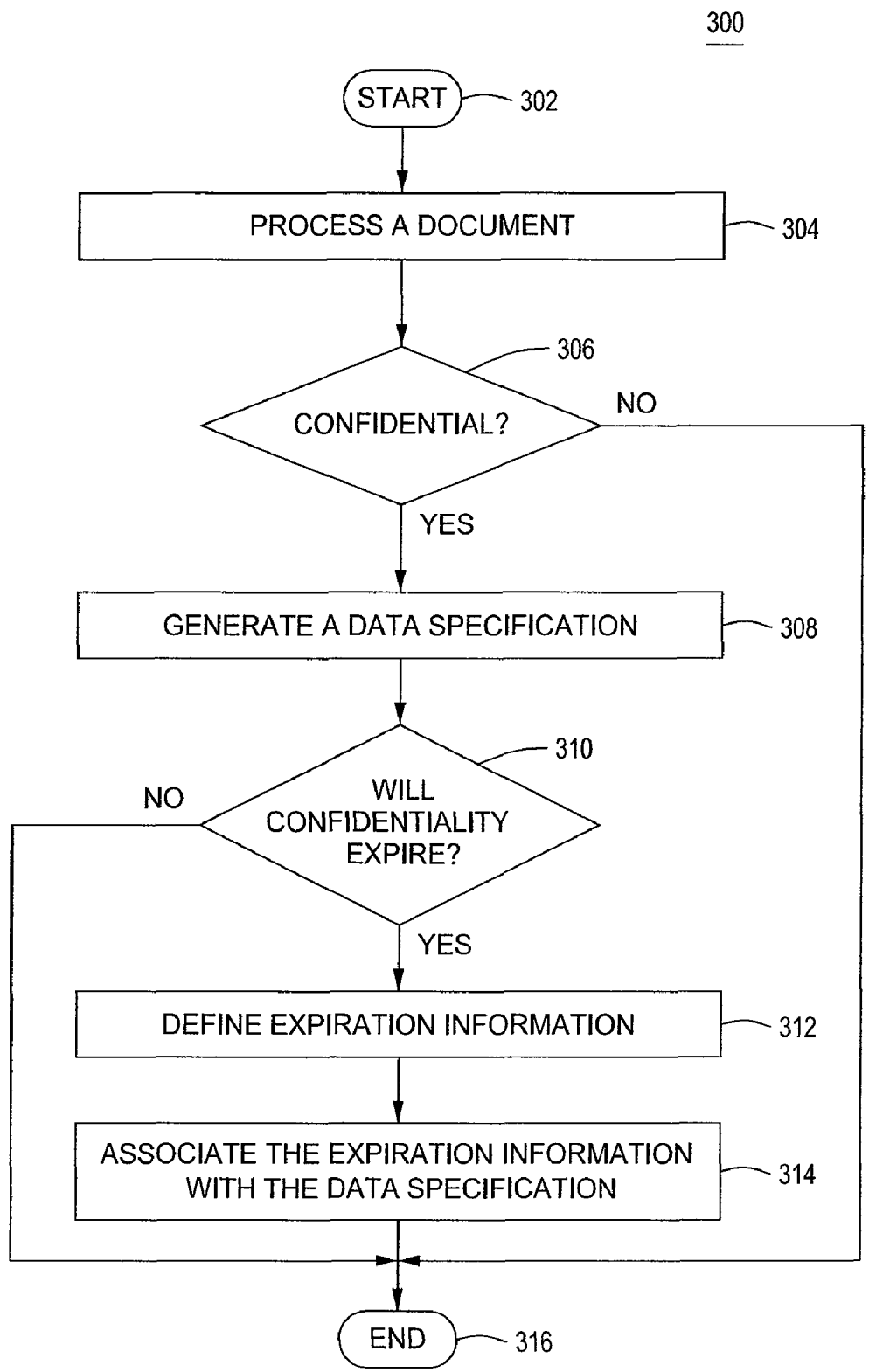
FIG. 3 is a flow diagram of method for processing expiration information according to various embodiments of the present invention.

FIG. 3 is a flow diagram of method 300 for processing expiration information according to various embodiments of the present invention. The method 300 begins at step 302 and proceeds to step 304.

At step 304, a document is processed. In one embodiment, the document is processed upon generation or creation (e.g., by a system administrator through the admin computer 104 of FIG. 1). At step 306, a determination is made as to whether the document is confident or not confidential. If the document is not confidential (option "No"), the method 300 proceeds to step 316. If the document is confidential (option "Yes"), the method 300 proceeds to step 308. At step 308, a data specification is generated for the document. At step 310, a determination is made as to whether the confidentiality of the document is to expire in the future. If the confidentiality of the document is to expire in the future (option "Yes"), the method 300 proceeds to step 312.

At step 312, expiration information is defined for the document (e.g., an expiration time period is specified). At step 314, the expiration information is associated with the data specification for the document. If the confidentiality of the document is not to expire in the future (e.g., continue indefinitely) (option "No"), the method 300 proceeds to step 316. At step 316, the method 300 ends.

While the foregoing is directed to embodiments of the present invention, other and further embodiments of the invention may be devised without departing from the basic scope thereof, and the scope thereof is determined by the claims that follow.

The invention claimed is:

1. A method for protecting confidential data from disclosure comprising:
   detecting whether a data specification has expired, wherein the data specification comprises a fingerprint associated with the confidential data;
   deleting the data specification if the data specification has expired, wherein
      the deleting prevents the fingerprint being used as a basis for comparison with outbound data; and
   comparing the outbound data with the fingerprint if the data specification has not expired, wherein
      the detecting, the deleting, and the comparing are performed by a computing device configured to act as a content filter and comprising a memory and a central processing unit (CPU).

2. The method of claim 1 further comprising establishing an expiration of the data specification that is based on a time period.

3. The method of claim 1 further comprising routing the confidential data, wherein the outbound data comprises the confidential data.

4. The method of claim 3, wherein the fingerprint is configured to be used to identify the confidential data in the outbound data and prevent the confidential data from transmission.

5. The method of claim 4, further comprising monitoring the outbound data.

6. The method of claim 1 further comprising:
   filtering the outbound data using the data specification in response to detecting that the data specification is not expired.

7. The method of claim 6 further comprising preventing a transmission of the confidential data, wherein the outbound data comprises the confidential data.

8. The method of claim 1, further comprising:
   associating an expiration with the data specification upon generation of the confidential data.

9. The method of claim 1, wherein the detecting further comprises:
   detecting an occurrence of an event in which the confidential data ceases to be confidential.

10. The method of claim 1, wherein the data specification comprises at least one of a specification of a document, a specification of an unstructured data repository or a policy based on a pattern.

11. An apparatus for protecting confidential data from disclosure, comprising:
    a data leakage prevention module stored in a memory coupled to a central processing unit (CPU) for monitoring outbound data for confidential data using at least one data specification and expiration information; and,
    wherein
    the data leakage prevention module is configured to
    detect whether a data specification has expired, wherein the data specification comprises a fingerprint associated with the confidential data;
    delete the data specification if the data specification has expired,
       wherein
       the deleting prevents the fingerprint being used as a basis for comparison with outbound data; and
    compare the outbound data with the fingerprint if the data specification has not expired.

12. The apparatus of claim 11, wherein the data leakage prevention module is configured to establish an expiration of the data specification based on a time period.

13. The apparatus of claim 11, wherein the fingerprint is configured to identify the confidential data within the outbound data.

14. The apparatus of claim 11, wherein the data leakage prevention module is configured to generate an interface for specifying expiration information for the data specification upon generation of the confidential data.

15. The apparatus of claim 11, wherein the data leakage prevention module is configured to compare the outbound data to the data specification to filter the confidential data.

16. A system for protecting confidential data from disclosure comprising:
    a computer for communicating outbound data; and
    an admin computer coupled to the computer, comprising:
       a data leakage prevention module configured to
       detect whether a data specification has expired, wherein the data specification comprises a fingerprint associated with the confidential data;
       delete the data specification if the data specification has expired,
          wherein
          the deleting prevents the fingerprint being used as a basis for comparison with outbound data; and
       compare the outbound data with the fingerprint if the data specification has not expired.

17. The system of claim 16, wherein the data leakage prevention module is configured to establish an expiration of the data specification based on a time period.

* * * * *